C. E. GRAY.
PROCESS OF DESICCATING.
APPLICATION FILED NOV. 10, 1913.
1,107,784.
Patented Aug. 18, 1914.
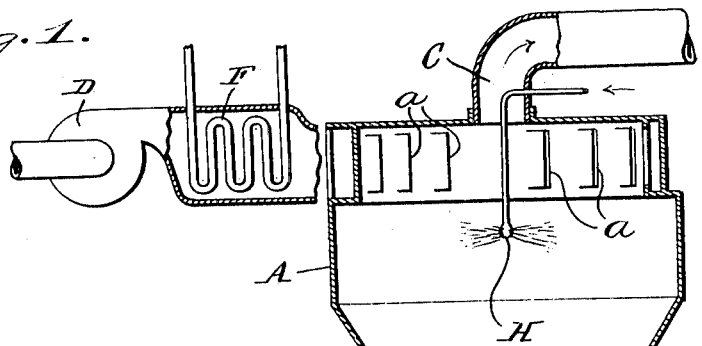
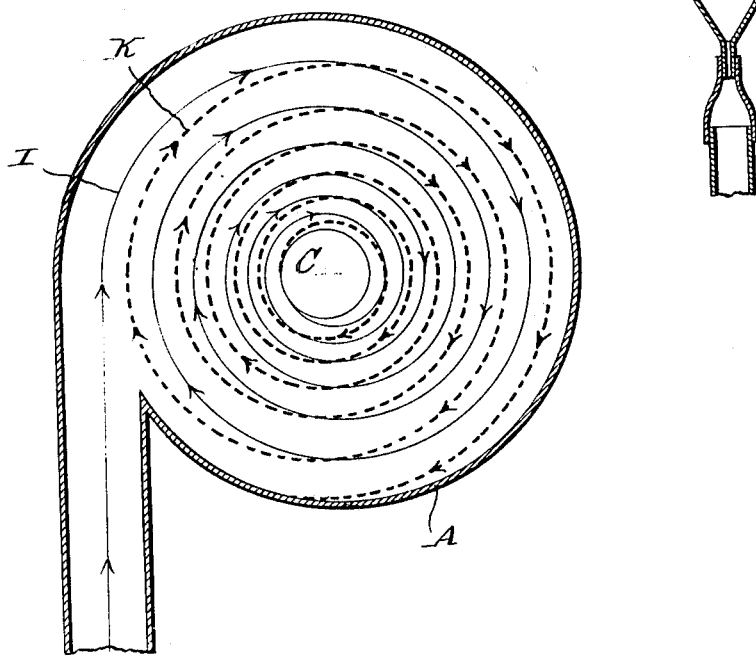
Witnesses
Halbert Brown
M. G. Crandell
Inventor
Chester Earl Gray
By Church & Church
his Attorneys

UNITED STATES PATENT OFFICE.

CHESTER EARL GRAY, OF EUREKA, CALIFORNIA, ASSIGNOR OF ONE-HALF TO AAGE JENSEN, OF OAKLAND, CALIFORNIA.

PROCESS OF DESICCATING.

1,107,784.   Specification of Letters Patent.   Patented Aug. 18, 1914.

Application filed November 10, 1913. Serial No. 800,188.

*To all whom it may concern:*

Be it known that I, CHESTER EARL GRAY, a citizen of the United States, residing at Eureka, in the county of Humboldt and State of California, have invented a certain new and useful Process of Desiccating; and I do hereby declare the following to be a full, clear, and exact description of the same, reference being had to the accompanying drawings, forming part of this specification, and to the figures and letters of reference marked thereon.

This invention relates to the desiccation of substances and is more especially designed as a process for the reduction of food materials to a dry and powdery condition, and it is, therefore, especially adapted for use in the production of powdered food materials from substances which exist normally in a more or less fluid condition, such, for example, as milk, cream, eggs, fruit juices, etc., etc., although in its broader aspect it may be well adapted for the drying or desiccation of practically any substance which may be subdivided and subjected to the free action of currents of air which carry off the moisture content, or produce the changes desired in the substance being treated.

While the invention is, as before stated, primarily designed as a process for desiccating more or less fluid substances and efficiency, therefore, would dictate the use of heated currents of air, it will be apparent to those skilled in the art that the converse is possible and the process may be utilized as a means whereby the substance being treated is caused to absorb elements from the treating media, or be otherwise acted upon as, for example, by the employment of cooled currents of air, the substance may be frozen and deposited in a more or less comminuted condition.

The invention contemplates a process which involves the creation of cyclonic currents of air or equivalent elastic fluid treating media, in which cyclonic currents the air or media moves centripetally or in converging spiral lines, and the introduction of the substance to be treated in a subdivided and preferably comminuted or atomized form, said substance being caused to travel centrifugally through the cyclonic current while partaking of its rotary movement; or, in other words, to travel spirally in lines diverging from the center.

Under these conditions the air and the substance being treated, while they both partake of the rotary or cyclonic movement, one gradually approaches the center and the other gradually recedes from the center of rotation, the air being discharged at the center and the substance being treated at the periphery with the result that the humidity of the air is gradually increased as it approaches the center and that of the substance being treated is decreased as it recedes from the center. The substance being treated is consequently gradually subjected to the action of air which is in condition to extract from it greater perecentages of moisture and it will, therefore, be reduced to a completely dry or desiccated condition. Where the air employed is heated air, it is also obvious that as the humidity of the air increases toward the center of rotation its temperature is reduced in proportion to the evaporation, and, therefore, the outer zones of air are of higher temperature than the inner zones, and the substance being treated is not only subjected gradually to the action of air of decreasing humidity, but to the action of air of increasing temperature, producing a desiccating effect which is far superior to any effect which can be attained by subjecting the materials to the action of air under conditions where the final desiccated product is conveyed by and exposed to the action of air of the greatest humidity and lowest temperature.

The practical development of the process for commercial purposes up to this time has been in the direction of producing powdered milk and in a contemporaneous application filed by myself and Mr. Aage Jensen, on December 27, 1911, Serial No. 668,182, which has matured into Pat. No. 1,078,848 dated Nov. 18, 1913, there is illustrated and described one form of apparatus, whereby the invention may be carried into effect.

In the accompanying drawings,—Figure 1 is a diagrammatic representation of a section of an apparatus in a vertical plane, with which the invention may be carried into practice, this view indicating a portion of the apparatus illustrated in Fig. 1 of the application above referred to. Fig. 2 is a diagrammatic plan view designed to illustrate the respective paths of the air or treating media and the substance being treated.

Like letters of reference in the several figures indicate the same parts.

In said drawings, the letter A indicates a chamber which is preferably of circular horizontal section and conveniently has a converging or tapering lower portion at B with a discharge opening for the substance being treated at the bottom, and a discharge opening for the treating media centrally at the top, this discharge opening being indicated at C. The treating media is introduced into the circular chamber peripherally in a tangential direction preferably by means of a pressure apparatus such as a blower D and is heated or its temperature controlled by a steam or other coil F over and around which it is caused to flow. The tangential entry of the treating media or air into the circular chamber sets up a cyclonic current therein and this effect may be augmented by introducing the air at a series of different points, as, for example, through the tangential openings a. Because of the fact that the air escapes only at the center or in the vortex area, the air is caused to travel in a converging spiral or centripetally with a constantly increasing angular velocity.

The substance to be treated, for example, a liquid substance such as that heretofore referred to, is discharged in a sub-divided condition, preferably atomized or neublized, at points centrally of the cyclonic current established in the chamber, as, for example, by being introduced under pressure from a nozzle H. As illustrated, this nozzle H is located directly in the center of the cyclonic current of air and while good practice dictates that this condition should be followed, it is, of course, obvious that it might be at any point substantially central or remote from the peripheral portion of the current and in position to be acted upon by the air currents and carried by them in their rotary movement. Owing to their specific gravity the particles of substance being treated will, through the action of centrifugal force be caused to travel in spiral lines outwardly through the current of air and in the apparatus illustrated they are finally arrested by the confining walls of the chamber down which they fall to the discharge at the bottom. The particles of substance being treated may be projected radially into the current of air, thus augmenting the action of centrifugal force and they will naturally have a downward trend, owing to the action of gravity, while the treating media or air will have an upward trend toward the discharge opening.

The relative direction of movement of the air current or air in the cyclonic current established, is indicated in Fig. 2 by the light spiral lines and darts I, while the path of travel of a particle of substance being treated is indicated by the heavier broken line and darts K, this illustration, of course, being diagrammatic and probably illustrating a less number of convolutions than would actually occur in an apparatus of workable commercial proportions, particularly where the design is to produce completely dried material from a substance normally carrying a large percentage of water, such, for example, as milk. From this figure of the drawing it will be apparent that the air or treating media discharged at the center of the cyclonic current will have taken up its maximum charge of moisture and the percentage of moisture will be gradually less toward the outside or periphery of the cyclonic current. The substance being treated which is discharged into the cyclonic current at the center carries its maximum moisture content which it gradually gives up to the air as it moves outwardly toward the periphery of the cyclonic current, and where heated air is employed the maximum heat exists in the air in the zones of minimum humidity. Therefore, the substance being treated is gradually subjected to the action of air of less and less humidity and higher and higher temperature until its moisture content is reduced to the minimum and in practice it is rendered practically dry.

With this process the speed of operation may be greatly increased over any process which involves the floating of the substance being treated in and with a current of air for the centrifugal force operating on the particles of substance being treated increases in proportion to the centripetal movement and speed of rotation of the air current, and so long as the specific gravity of the substance being treated is greater than that of the treating media, and the particles are of such size as to offer the minimum resistance to passage through the air or treating media, they will, in the operation of the device, travel centrifugally or outwardly and will not be carried off by the air or treating media escaping at the center.

Having thus described my invention, what I claim as new and desire to secure by Letters Patent of the United States, is:

1. The method of desiccating substances which consists in forming a cyclonic air current in which the air moves centripetally and in introducing the substance to be treated in finely divided form, centrally of the cyclonic current and causing the particles thereof to travel centrifugally through the air current while partaking of its rotary movement.

2. The method of desiccating fluid substances which consists in forming a cyclonic air current in which the air moves centripetally, introducing the fluid substance in atomized form centrally of the cyclonic current and causing the particles thereof to travel centrifugally through the air current while partaking of its rotary movement.

3. The method of desiccating fluid substances which consists in forming a cyclonic current of heated air in which the air moves centripetally, introducing the substance in atomized form centrally of the cyclonic current and causing the particles thereof to travel centrifugally through the air current whereby such particles are subjected to the action of air of gradually decreasing humidity and increasing temperature.

4. The method of treating substances in finely divided form, which consists in forming a cyclonic current of an elastic fluid treating medium in which the medium moves centripetally and in introducing the substance to be treated in finely divided form centrally of the cyclonic current and in causing the particles thereof to travel centrifugally through the medium to the periphery of the cyclonic current.

5. The method of treating substances in finely divided form to reduce the percentage of free moisture contained therein, which consists in forming a cyclonic current of an elastic fluid treating medium in which the medium moves centripetally and in introducing the substance to be treated in finely divided form centrally of the cyclonic current and in causing the particles thereof to travel centrifugally through the medium to the periphery of the cyclonic current.

6. The method of desiccating fluid substances which consists in forming a cyclonic air current in which the air moves centripetally, introducing material in atomized condition centrally into said cyclonic current, maintaining said cyclonic current by renewing the air constantly in sufficient volume to carry off the moisture content of the material being treated and separating the material from the air current by causing the same to travel centrifugally through the said current in opposition to the centripetal movement of the air.

CHESTER EARL GRAY.

Witnesses:
ALEXANDER S. STEWART,
THOMAS DURANT.